United States Patent
Enggist et al.

(10) Patent No.: US 12,521,922 B2
(45) Date of Patent: Jan. 13, 2026

(54) SYSTEM FOR PRODUCING AT LEAST ONE THREE-DIMENSIONAL ELEMENT ON AN EXTERNAL PART ELEMENT OF A TIMEPIECE

(71) Applicant: Rubattel & Weyermann S.A., La Chaux-de-Fonds (CH)

(72) Inventors: Yann Enggist, Ins (CH); Frédéric Jeanrenaud, La Chaux-de-Fonds (CH)

(73) Assignee: Rubattel & Weyermann S.A., La Chaux-de-Fonds (CH)

( * ) Notice: Subject to any disclaimer, the term of this patent is extended or adjusted under 35 U.S.C. 154(b) by 455 days.

(21) Appl. No.: 18/059,457

(22) Filed: Nov. 29, 2022

(65) Prior Publication Data

US 2023/0191670 A1 Jun. 22, 2023

(30) Foreign Application Priority Data

Dec. 20, 2021 (EP) .................................... 21216096

(51) Int. Cl.
*B29C 45/14* (2006.01)
*B29C 45/00* (2006.01)
(Continued)

(52) U.S. Cl.
CPC ...... *B29C 45/1418* (2013.01); *B29C 45/0053* (2013.01); *B29C 45/73* (2013.01);
(Continued)

(58) Field of Classification Search
CPC ..... B29C 45/00; B29C 45/14; B29C 45/0053; B29C 45/1418; B29C 45/14819;
(Continued)

(56) References Cited

U.S. PATENT DOCUMENTS

| | | |
|---|---|---|
| 2011/0236580 A1 | 9/2011 | Winkler et al. |
| 2015/0316893 A1 | 11/2015 | Winkler et al. |
| 2015/0352593 A1 | 12/2015 | Winkler et al. |
| 2020/0398465 A1 | 12/2020 | Enggist et al. |

FOREIGN PATENT DOCUMENTS

| | | |
|---|---|---|
| CH | 395 870 | 7/1964 |
| EP | 2 192 454 A1 | 6/2010 |

(Continued)

OTHER PUBLICATIONS

Decision of Refusal issued Jun. 11. 2024, in corresponding Japanese Patent Application No. 2022-199981 (with English Translation), 6 pages.

(Continued)

*Primary Examiner* — Yunju Kim
(74) *Attorney, Agent, or Firm* — Oblon, McClelland, Maier & Neustadt, L.L.P.

(57) ABSTRACT

A system for producing at least one three-dimensional element on a visible face of an external part element of a timepiece implementing this process, the system including a mould formed by the reversible assembly of a first part and a second part configured to receive a support plate of the external part element, the mould including at least one cavity formed by associating the first part including at least one impression with the visible face of the external part element, each cavity helping produce a blank of the three-dimensional element from an over-moulding by injecting injectable material onto the visible face, and a device for applying a coating onto the blank over-moulded on the visible face of the external part element helping finalise this blank of the three-dimensional element.

11 Claims, 4 Drawing Sheets

(51) Int. Cl.
    *B29C 45/73*     (2006.01)
    *B29L 31/00*     (2006.01)
    *G04B 19/10*     (2006.01)

(52) U.S. Cl.
    CPC ...... *G04B 19/10* (2013.01); *B29C 2045/0079* (2013.01); *B29C 2045/14868* (2013.01); *B29C 2045/14967* (2013.01); *B29L 2031/739* (2013.01)

(58) Field of Classification Search
    CPC ................ B29C 45/2602; B29C 45/73; B29C 2045/0027; B29C 2045/0079; B29C 2045/14868; B29C 2045/14967; B29C 45/0025; B29C 45/14344; G04B 19/10; G04D 3/0048; B29L 2031/739
    See application file for complete search history.

(56) References Cited

FOREIGN PATENT DOCUMENTS

| | | |
|---|---|---|
| GB | 2 027 636 A | 2/1980 |
| JP | 63-44180 U | 3/1988 |
| JP | 2021-515204 A | 6/2021 |
| WO | WO 2019/185422 A1 | 10/2019 |

OTHER PUBLICATIONS

European Search Report Issued May 18, 2022, in European Patent Application 21216096.4 filed on Dec. 20, 2021 (with English Translation of Categories of Cited Documents), 3 pages.

Office Action issued Jan. 9, 2024, in corresponding Japanese Patent Application No. 2022-199981 (with English Translation), 9 pages.

SYSTEM FOR PRODUCING AT LEAST ONE THREE-DIMENSIONAL ELEMENT ON AN EXTERNAL PART ELEMENT OF A TIMEPIECE

CROSS-REFERENCE TO RELATED APPLICATION

This application claims priority to European Patent Application No. 21216096.4 filed on Dec. 20, 2021, the entire disclosure of which is hereby incorporated herein by reference.

TECHNICAL FIELD OF THE INVENTION

The invention relates to a process and a system for producing at least one three-dimensional element on a visible face of an external part element of a timepiece.

The invention also relates to an external part element comprising at least one three-dimensional element.

The invention also relates to the timepiece including such an external part element.

TECHNOLOGICAL BACKGROUND

In the prior art, three-dimensional elements such as appliques provided to be disposed on external part elements such as watch dials, are most often produced using processes implementing transfer, or silkscreen or forming techniques of a bottom face of the dial with the relief parts forming the appliques which are then in this context polished, varnished, or coated with a luminescent pigment. These appliques can also be parts mounted on the dial while being produced using processes implementing techniques of stamping/machining a metal plate followed by gluing, for example by means of a hot-setting glue.

When it is sought to obtain high-quality parts, the appliques are then most often provided with feet for the fastening thereof to the dial by gluing, welding or riveting. The appliques are roughed out using processes implementing machining or stamping techniques in a profile, then reworked by faceting. However, one of the drawbacks of such processes is linked with the fact that they can be the cause of the presence of imperfections on the surfaces of these appliques.

Furthermore, these different processes often require a lot of handling by the operators tasked with them, which proves to be time-consuming and fastidious given the small size of the parts to be handled, in particular placing in the dial.

SUMMARY OF THE INVENTION

The aim of the present invention is that of remedying all or some of the drawbacks cited above by proposing a process and a system for producing at least one three-dimensional element on a visible face of an external part element of a timepiece which is of high quality.

In this aim, the invention relates to a process for producing at least one three-dimensional element on a visible face of an external part element of a timepiece, said process comprising the following steps:

- designing a support plate comprising the external part element including a sub-step of creating at least one through opening in the thickness of the external part element, said through opening comprising a variable cross-section along its revolution axis interconnecting the centres of its entry and exit orifices with each other;
- arranging a support plate comprising the external part element in a mould formed by the reversible assembly of a first and a second parts, said arrangement step comprising a sub-step of forming at least one cavity in this mould by associating the first part including at least one impression with the visible face of the external part element;
- constructing a blank of each three-dimensional element on the visible face of the external part element, said step comprising a sub-step of over-moulding by injecting an injectable material into the cavity via a through opening arranged in said external part element provided with an entry orifice of said cavity;
- finalising the blank of the three-dimensional element comprising a sub-step of applying a coating on said blank over-moulded on the external part element after carrying out one of the following sub-steps of this finalisation step:
  - a sub-step of disassembling the first part from the second part of the mould, or
  - a sub-step of removing said mould from the support plate comprising the external part element provided with at least one blank of a three-dimensional element over-moulded on the face thereof.

In other embodiments:

- said arrangement step comprises a sub-step of reversible assembly of the second part with the support plate comprising the external part element, said sub-step comprising a connection phase of one end of an injection circuit arranged in this second part with the entry orifice of the through opening of the external part element;
- said removal sub-step comprises a phase of breaking an injection point connecting said external part element to the second part;
- the over-moulding sub-step comprises a phase of regulating the temperature of said mould particularly during a period spreading from before the start of the phase of injecting injectable material into the cavity to the end of this material injection phase or after this end of this injection phase;
- the over-moulding sub-step comprises a phase of evacuating said cavity before the phase of injecting the injectable material into this cavity;
- the application sub-step comprises a phase of depositing a decorative and/or functional material on a visible outer face of the blank of the three-dimensional element over-moulded on the external part element;
- the process comprises a step of preparing at least one impression in the first part using at least one original part relative to said at least one three-dimensional element to be manufactured;
- the step of designing the support plate comprises a sub-step of creating at least one blind opening in the thickness of the external part element, said blind opening comprising a variable cross-section along its revolution axis interconnecting the centres of the injectable material entry orifice and the bottom of this opening with each other.

The invention also relates to a system for producing at least one three-dimensional element on a visible face of an external part element of a timepiece implementing this process, the system comprising:

- a mould formed the reversible assembly of a first part and a second part configured to receive a support plate of the external part element, the mould comprising at least one cavity formed by associating the first part including at least one impression with the visible face of the external part element, each cavity helping produce a blank of the three-dimensional element from an overmoulding by injecting injectable material onto said visible face, and a device for applying a coating onto said blank overmoulded on the visible face of the external part element helping finalise this blank of the three-dimensional element.

The invention also relates to an external part element for a timepiece comprising at least one three-dimensional element capable of being produced on the visible face thereof using said process.

The invention also relates to a timepiece comprising such an external part element.

BRIEF DESCRIPTION OF THE FIGURES

Other aims, advantages and features of the present invention will become more apparent from the following description, made with reference to the appended figures listed below.

DETAILED DESCRIPTION OF THE INVENTION

Figure 1:
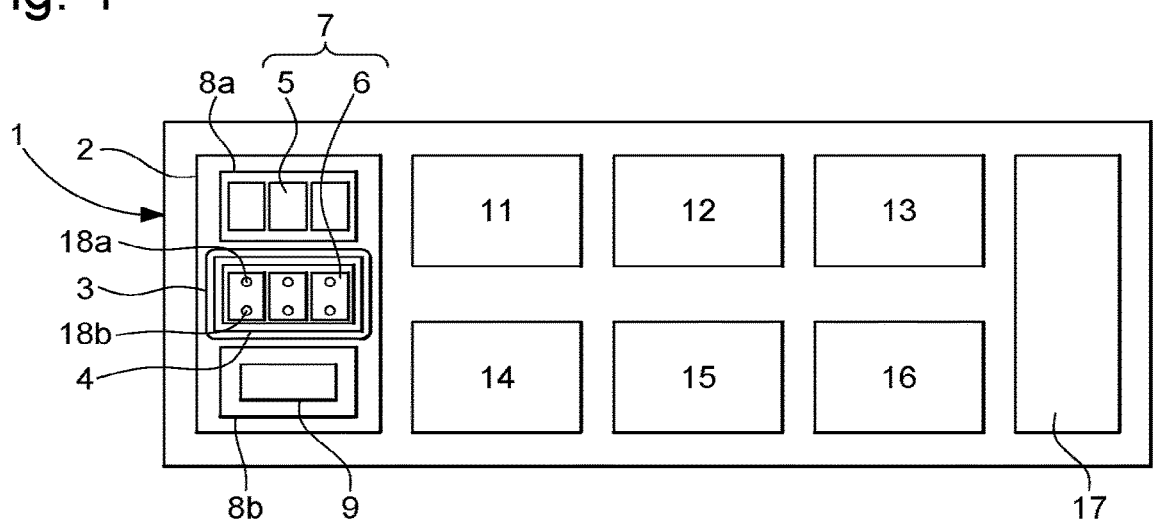
FIG. 1 is a representation of a system for producing at least one three-dimensional element on a visible face of an external part element of a timepiece, according to an embodiment of the invention.

FIG. 1 shows a schematic representation of a system 1 for producing at least one three-dimensional element 10 on an external part element 4 of a timepiece 100. This three-dimensional element 10 represented in FIGS. 1, 2, 4 to 9, is produced on a visible face 21a, also referred to as top face, of this external part element 4 i.e. on a face 21a which can be viewed by the wearer of the timepiece 100 when this external part element 4 is mounted in this part 100. This face 21a of the external part element 4 is referred to as "visible" with reference to the possibility that it has of being perceived when it is fitted in the timepiece 100 and, unlike the other face 21b of this external part element 4 which is opposite this visible face 21a for example when this element 4 is a dial.

Such a system 1 is capable of being implemented within an automatic assembly installation (or automatic assembly line) dedicated to the manufacture of all of part of a timepiece 100. In such a context, this system 1 helps manufacture and ensure the distribution of external part elements 4 comprising at least one three-dimensional element 10 within this automatic assembly installation.

The timepiece 100 consists of external part elements 4 and horological components (not shown) which are assembled together. In this context, the external part elements 4 can be visible or observable elements of the timepiece 100 when the latter is worn by the user also known as the wearer. In terms of horological components, they comprise non-restrictively and non-exhaustively elements forming the horological movement, the joints and/or rings comprised in this timepiece 100. Under these conditions, it is therefore understood that each external part element 4 is among the elements of the timepiece 100 which surround the horological movement and which gives the watch the external appearance, visual appeal and style thereof. For example, this external part element 4 can be non-restrictively and non-exhaustively a dial, a flange, a bezel, etc.

Figure 9:
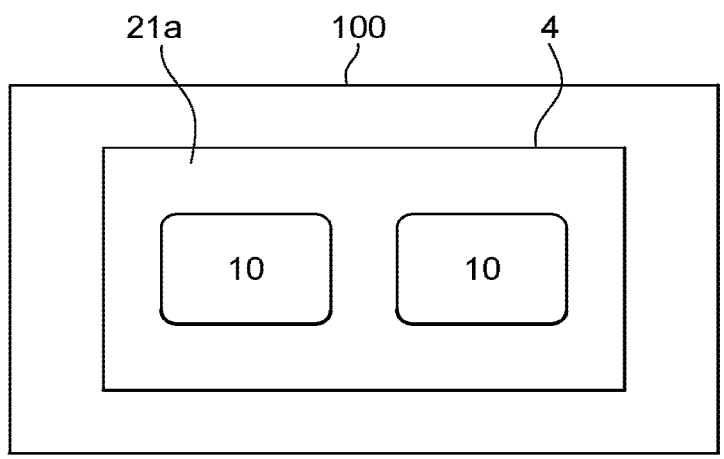
FIG. 9 represents a timepiece comprising an external part element provided with at least one three-dimensional element, according to an embodiment of the invention.

It will be noted that in the embodiment described and with reference to FIG. 9, the external part element 4 is here the dial of the timepiece 100 and the three-dimensional element 10 is an applique of this dial.

As we mentioned above, this external part element 4 also comprises a so-called hidden face 21b, also referred to as bottom face, which is an opposite face of the visible face 21a (visible in FIGS. 4 to 8).

Figure 2:
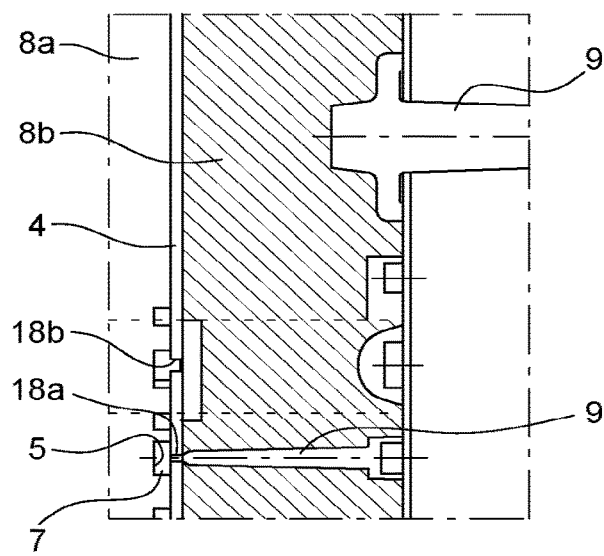
FIG. 2 is a sectional view of a part of a mould of the system, according to the embodiment of the invention.

With reference to FIGS. 1 and 2, this system 1 comprises non-exhaustively and non-restrictively:

a mould 2 formed by the reversible assembly of a first part 8a with a second part 8b capable of receiving a support plate 3 comprising at least one external part element 4.

a device for injecting 11 an injectable material into this mould 2;

a device 12 for applying a coating on a blank of the three-dimensional element 10 over-moulded on the external part element 4;

a device 13 for designing an original or "master" part in relation to the three-dimensional element 10 to be manufactured, particularly implementing lithography techniques in particular ultraviolet project optical lithography, deep ultraviolet (DUV) projection optical lithography, immersion lithography, double exposure lithography, extreme ultraviolet lithography and/or nanoimprint lithography;

a device 14 for preparing said at least one three-dimensional element 10 from the original part particularly implementing Ni-shims or BMG replication techniques;

a device 15 for evacuating said mould 2 and/or a device 16 for regulating the temperature inside this mould 2, and a device 17 for removing and arranging the support plate 3 of at least one external part element 4 in the mould 2.

In this configuration, this mould 2 comprises a bed formed by the assembly of the first part 8a with the second part 8b and wherein the support plate 3 comprising the external part element 4 is capable of being arranged. It is understood that the plate 3 can comprise a single external part element 4 or in an alternative several external part elements 4.

In this mould 2, the second part 8b comprises a receiving face configured to receive such a support plate 3. More specifically, the support plate 3 is fitted on the receiving face of the second part 8b such that the hidden face 21b of the external part element 4 is arranged facing or in contact with all or part of this receiving face. In this configuration, the visible face 21a of the external part element 4 is for its part facing and in contact with an inner face of the first part 8a. In other words, the support plate 3, and therefore the external part element 4, is arranged in the bed of this mould 2 while being sandwiched between the first and second parts 8a, 8b of this mould 2.

The inner face of this first part 8a of the mould 2 can comprise a single impression 5 or several impressions 5 each in relation to a three-dimensional element 10 to be over-moulded on the visible face 21a of the external part element 4. These impressions 5 each have a hollow shape defined in this planar inner face of the first part 8a.

The visible face 21a of the external part element 4 comprises a zone 6, also referred to as over-moulding zone 6, which is defined to form with said impression 5 a cavity 7 wherein an injectable material is injected, so as to contribute to the design of said blank 20 of the three-dimensional element 10. This cavity 7 defines the final shape of said blank 20 and therefore of the three-dimensional element 10 which are produced by the cooperation of the impression 5 and the corresponding zone 6 of the visible face 21a of the external part component 4. In this configuration, this zone 6 is therefore arranged facing said impression 5 when the first part 8a and the external part element 4 are assembled together. It will be noted that the mould 2 comprises as many cavities 7 as this first part 8a includes impressions 5 and/or as the external part element 4 comprises over-moulding zones 6.

In this context, when the system 1 is provided with the device 16 for regulating the temperature inside said mould 2, the first part 8a can then comprise an injection circuit (not shown) defined in the body of this first part 8a which is essentially arranged below each impression 5. Such a circuit is connected to the temperature regulation device 16 which is then capable of generating the circulation of a cooling fluid or a heating fluid in this circuit.

In the external part element 4 comprised in the support plate 3, the visible face 21a and the hidden face 21b are preferably planar. These visible and hidden faces 21a, 21b are also referred to respectively as the top and bottom faces of the external part element 4. In this mould 2, the visible face 21a of this external part element 4 is capable of being in contact with the inner face of the first part 8a when this first part 8a is assembled with the second part 8b. In this configuration, it is understood that the external part element 4 is arranged in this mould 2 while being sandwiched between these first and second parts 8a, 8b.

With reference to FIG. 2, this external part element 4 also comprises at least one through opening 18a, also referred to as through channel or through hole, connecting the hidden face 21b of the external part element 4 to the receiving face of the second part 8b, this through opening 18a comprising a first end, referred to as exit orifice, opening into the cavity 7 of the mould 2 and a second end opening onto the hidden face 21b of the external part element 4 referred to as entry orifice. It is understood that the external part element 4 comprises at least as many through openings 18a as the mould 2 comprises cavities 7.

Figure 7:
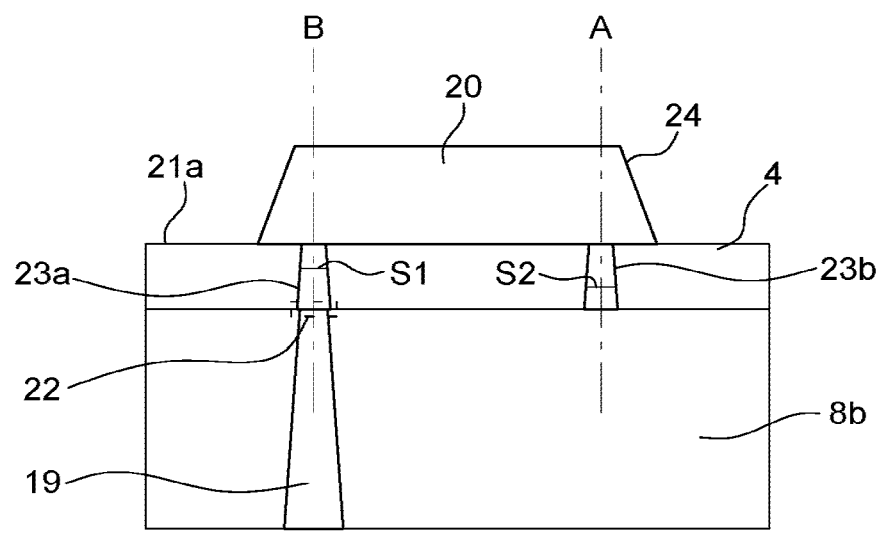
FIGS. 7 and 8 are sectional views of different three-dimensional element blanks over-moulded on the external part element, according to the embodiment of the invention.
Figure 8:
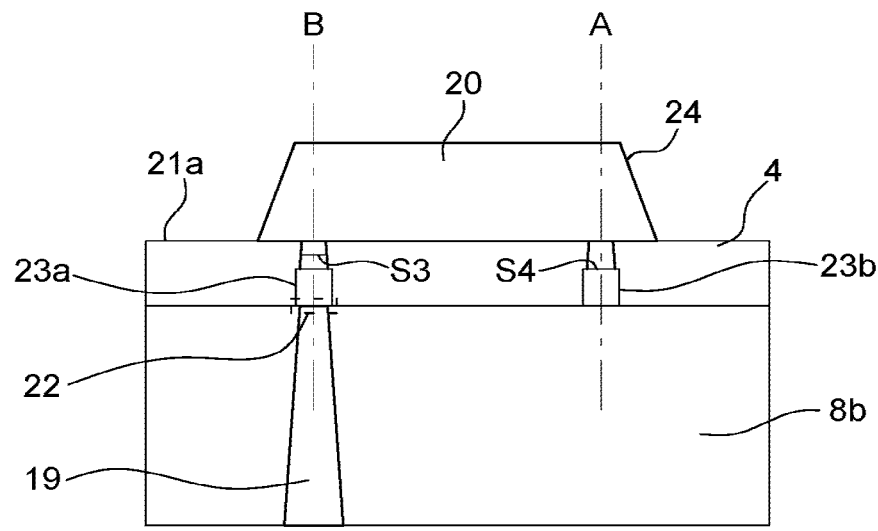

It will be noted with reference to FIGS. 7 and 8 that when the external part element 4 is a dial, this through opening 18a comprising injectable material helps form a foot 23a, of the three-dimensional element 10. This foot 23a is configured particularly in the shape thereof to secure this three-dimensional element 10 in the body of the external part element 4. Moreover, the zone 6 which is provided to form with said impression 5 the cavity 7, can comprise in addition to this through opening 18a, a blind opening 18b, also referred to as blind hole, comprising an entry orifice defined in the visible face 21a of the external part element 4. Such a blind opening 18b comprising injectable material helps form another foot 23b of the three-dimensional element 10 which is also configured particularly in the shape thereof to secure this three-dimensional element 10 in the body of the external part element 4.

In this context, the body of these through and blind openings 18a, 18b is formed from a set of axial cross-sections S1, S2, S3, S4 which are perpendicular to a longitudinal axis A, B of these openings 18a, 18b. In this configuration, the through opening 18a extends along the longitudinal axis A, otherwise called the revolution axis A, interconnecting the centres of the entry and exit orifices. In terms of the blind opening 18b, it also extends along the longitudinal axis B, otherwise called the revolution axis B, interconnecting the centres of the injectable material entry orifice and the bottom of this opening 18b. These longitudinal axes A, B are substantially parallel or strictly parallel with each other. In this configuration, it will be noted that:

the through opening 18a comprises at least one axial cross-section S1, S3 between the entry orifice and the exit orifice, the surface area whereof is strictly different or substantially different from an axial cross-section comprising the entry orifice and a surface area of an axial cross-section comprising the entry orifice and a surface area of an axial cross-section comprising the exit orifice;

the through opening 18a comprises at least one axial cross-section S1, S3 between the entry orifice and the exit orifice, the surface area whereof is strictly different or substantially different from an axial cross-section comprising the entry orifice or a surface area of an axial cross-section comprising the entry orifice or a surface area of an axial cross-section comprising the exit orifice;

the through opening 18a comprises at least one axial cross-section S1, S3 between the entry orifice and the exit orifice, the surface area whereof is
strictly greater or substantially greater than a surface area of an axial cross-section comprising the exit orifice, and/or
strictly less or substantially less than a surface area of an axial cross-section comprising the entry orifice;

the blind opening 18b comprises at least one axial cross-section S2, S4 between the entry orifice and the bottom, the surface area whereof is strictly different or substantially different from an axial cross-section comprising the entry orifice and a surface area of an axial cross-section comprising the entry orifice and a surface area of an axial cross-section comprising the bottom;

the blind opening 18b comprises at least one axial cross-section S2, S4 between the entry orifice and the bottom, the surface area whereof is strictly different or substantially different from an axial cross-section comprising the entry orifice or a surface area of an axial cross-section comprising the entry orifice or a surface area of an axial cross-section comprising the bottom;

the blind opening 18b comprises at least one axial cross-section S2, S4 between the entry orifice and the bottom, the surface area whereof is:

strictly greater or substantially greater than a surface area of an axial cross-section comprising the exit orifice, and/or strictly less or substantially less than a surface area of an axial cross-section comprising the entry orifice.

In this configuration, it is therefore understood that the through opening 18a comprises a variable cross-section along its revolution axis interconnecting the centres of the entry and exit orifices with each other. Similarly, the blind opening 18b comprises a variable cross-section along its revolution axis interconnecting the centres of the injectable material entry orifice and the bottom of this opening with each other. It can be noted that in this context, each section is transverse with respect to the axis of revolution A, B. It can be noted that the section here relates to the surface, the diameter and/or the dimension of a cross plane section plane section of the blind opening or the through opening.

In this context and for example, in FIG. 7, the through opening 18a and the blind opening 18b can have an essentially frustoconical shape or a shape similar to that of a tube in which the body comprises two parts having different cross-sections or different diameters as represented in FIG. 8.

As we have mentioned, the mould 2 comprises at least one cavity 7. This cavity 7 is formed by the assembly of the impression 5 comprised in the inner face of the first part 8a with the corresponding zone 6 of the visible face 21a of the external part element 4. The zone 6 comprises the through opening 18a arranged in the external part element 4 which opens via the exit orifice thereof into the cavity 7. This through opening 18a is connected/linked via the entry orifice thereof to the injectable material injection device 11, via the injection circuit 9 defined in the second part 8b of the mould 2. It will be noted that in this configuration, when the cavity 7 also comprises a blind opening 18b, the entry orifice of this opening is then defined in the over-moulding zone 6 of the visible face 21a of the external part element 4.

In this configuration, the portion of injectable material which is solidified in the entry orifice of the through opening 18a forms an injection point 22 which is defined to be broken particularly during the detachment of the external part element 4 with the second part 8b as described hereinafter. Indeed, this injection point 22 helps hold the support plate 3, and therefore the external part element 4, on the second part 8b by linking it to a sprue 19 formed in this mould 2. This injection point 22 is located preferably at the entry orifice of the through opening 18a. In other words, this injection point 22 is located at the end or at the base of the foot 23a, formed in the through opening 18a, of this three-dimensional element 10.

Figure 6:
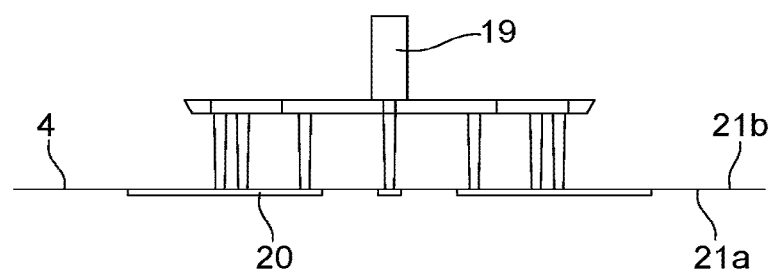
FIG. 6 is a profile view of the support plate comprising the external part element as well as a sprue formed in the mould, according to the embodiment of the invention.

It will be noted that this sprue 19 which can be seen in FIG. 6, comprises a first part formed by the solidification of the injectable material in the through opening 18a and a second part formed by the solidification of the injectable material in the injection circuit 9 arranged in the second part 8b.

Furthermore, in this configuration, it is understood that the impression 5 forms the visible part of the three-dimensional element 10 such as an applique when the external part element 4 is a dial, and the corresponding zone 6 of the external part element 4 for its part helps form the linking part of this applique with the dial using the feet 23a, 23b of this applique.

As we have already mentioned, in this mould 2, the second part 8b is provided to be assembled reversibly with an assembly face of the support plate 3 and/or with the hidden face 21b of the external part element 4. This second part 8b comprises said at least one injectable material injection circuit 9 connected at a first end to the injection device 11 and at a second end to each through opening 18a of the external part element 4 of the support plate 3. It will be noted that when the system 1 is provided with the device for evacuating 15 said mould 2, a vacuum circuit can be defined in the body of the second part 8b which is connected at one end to a through opening 18a of the external part element 4 as well as at another end to this evacuation device 15, said device 15 thus being capable of causing an air space in each cavity 7 of the mould 2. In this configuration, it is understood that one of the functions of the second part 8b is that of providing the routing of the injectable material to the through opening 18a for injecting material and help where applicable to evacuate the cavity 7 of the mould 2.

In this system 1, the device 12 for applying a coating on a blank 20 of the three-dimensional element 10 over-moulded on the external part element 4 is capable of applying/depositing a coating comprising a metallic type decorative material and/or a functional material on an outer surface 24 of the blank 20 of this three-dimensional element 10. Such a device 12 can comprise a printing module provided particularly with an organ for ejecting this decorative and/or functional material, and/or an organ for vaporising such a material and/or an organ for vaporising a coat/film including such a material. It will be noted that the vaporising organ can be a direct current cathode sputtering organ or a high-power impulse magnetron sputtering organ better known as the acronym HIPIMS. It will be noted that other techniques can be used such as those referred to as "hot transfer" of the coating onto the blank 20.

In this system 1, the decorative material can be formed from an ink, or from a metal or a metal alloy. This decorative material helps modify the visual appearance of the three-dimensional element 10 by being applied on the blank 20 of this three-dimensional element 10. In terms of the functional material, it is intended to give the three-dimensional element 10 physical and/or chemical functional characteristics linked for example with:

electrical conductivity, semiconductor or insulating nature;
semi-conductivity;
electroluminescence;
photoluminescence (for example a reaction to ultraviolet radiation);
phosphorescence;
"X-chromism" (photochromic, electrochromic, thermochromic, ionochromic, mechanochromic, etc.);
electroactivation;
magnetism;
etc.

In this system 1, the injectable material is for example an organic and/or composite material, or a metallic or ceramic material or a thermodeformable, thermosetting, or thermoplastic material. By way of examples, this material can comprise the following elements:

SLN (phosphorescent) type charged plastic and colour and/or fluorescent pigments;
polymer charged with ceramic with and without colour pigment;
an additive for giving a metallic/glossy appearance, such as aluminium powder, metallic powder;

additive for making the polymer conductive (for technical reasons or for a chemical/galvanic or other post-treatment);

additive giving an aesthetic finish imitating a material (nacre, stone, etc.);

additive giving specific mechanical and/or tribological characteristics;

BMG better known under the acronym "Bulk Metallic Glass";

stainless material;

sinterable metallic material;

ceramic;

silicon, and/or combination of one or another of these elements with each other or several thereof with each other.

In this configuration, it is understood that such a system 1 can make it possible to manufacture several three-dimensional elements 10 over-moulded simultaneously on the visible face 21a of the external part element 4. For this purpose, the first part 8a then comprises several impressions 5 and is capable of helping particularly with the external part element 4 obtain a series of three-dimensional elements 10 over-moulded on the visible face 21a of this external part element 4. Alternatively, it is understood that the first part 8a can comprise a single impression 5 relative to a blank of the three-dimensional element 10 over-moulded in the visible face 21a of the external part element 4.

Figure 3:
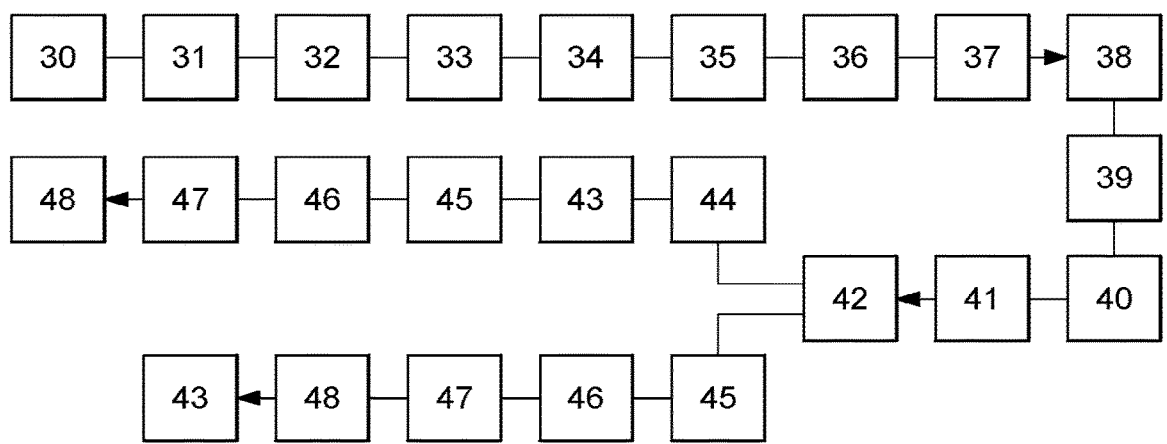
FIG. 3 is a logic diagram relative to a process for producing said at least one three-dimensional element on the visible face of the external part element, according to the embodiment of the invention.
Figure 4:
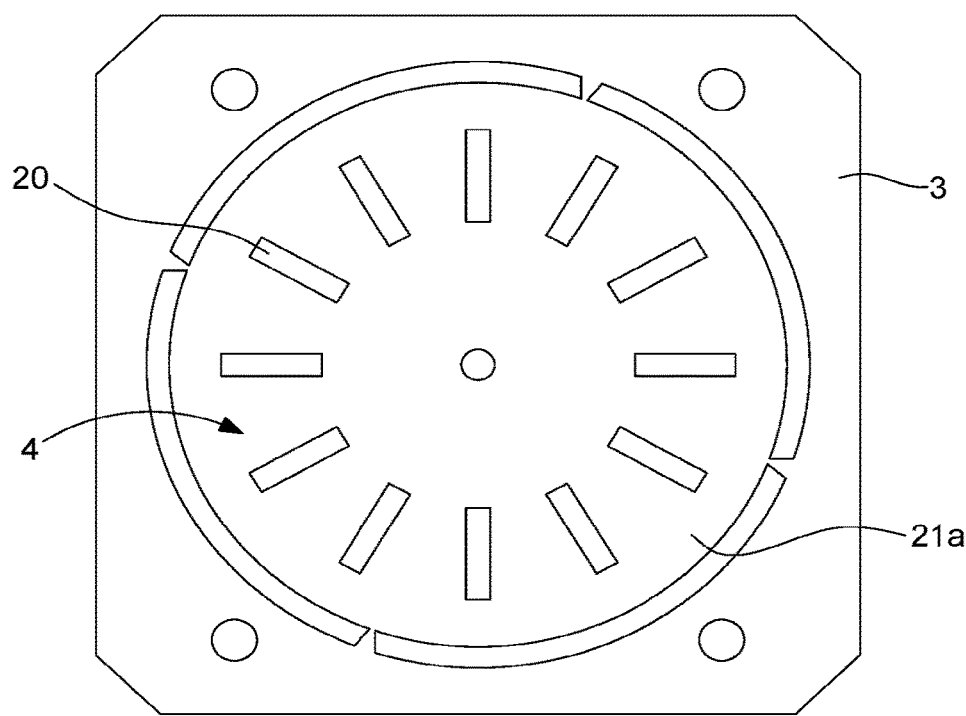
FIG. 4 is a representation of a support plate comprising the external part element here a dial of the timepiece, in this figure, a visible face of this dial can be seen, provided with several three-dimensional element blanks, such as appliques, over-moulded on this face, according to the embodiment of the invention.
Figure 5:
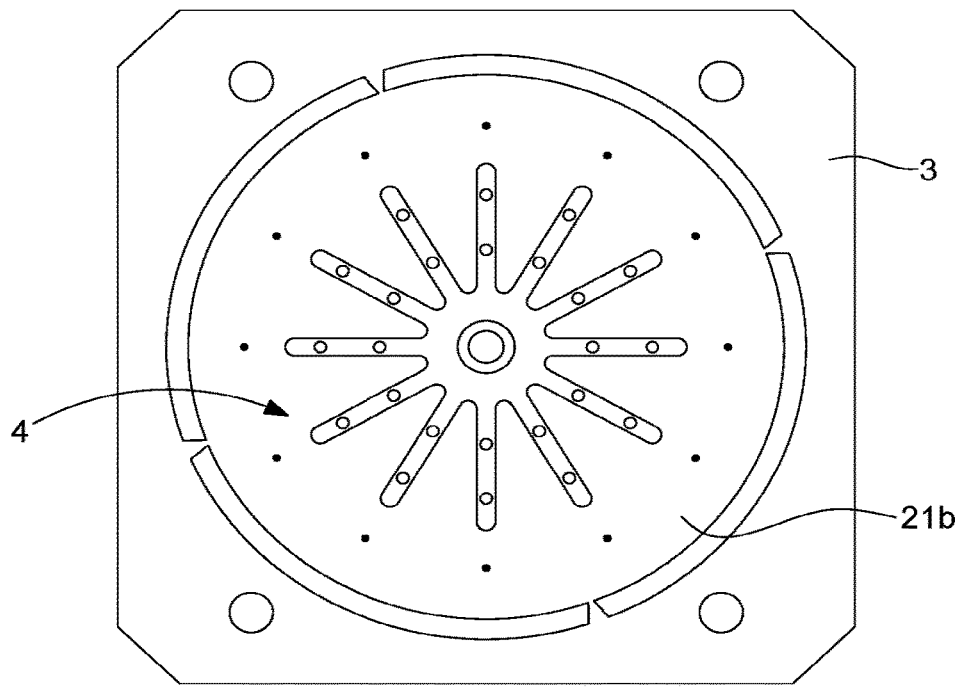
FIG. 5 is a representation of the support plate comprising the external part element here a dial of the timepiece, in this figure, a hidden face of this dial can be seen, which is connected to a sprue essentially formed by a second part of the mould not shown, according to the embodiment of the invention.

With reference to FIG. 3, this system 1 implements a process for producing said at least one three-dimensional element 10 on the visible face 21a, of the external part element 4 of the timepiece 100.

Such a process comprises a step of designing a support plate 3 comprising the external part element 4. Said step comprising a sub-step of producing several through holes in the thickness of the body of a support plate blank, said holes delimiting in such a plate blank the edge of the external part element 4. In this configuration, the external part element 4 is held to the rest of the body of the blank plate by parts of this plate each comprised between two holes.

This step of designing then comprises a sub-step of creating at least one through opening 18a in the thickness of the external part element 4, said through opening 18a comprising a variable cross-section along its revolution axis A interconnecting the centres of its entry and exit orifices with each other. Such a configuration of the through opening 18a contributes to defining the shape of the foot 23a of the three-dimensional element 10 formed by the injectable material included in this through opening 18a. Thus this foot 23a is configured particularly in the shape thereof to secure this three-dimensional element 10 in the body of the external part element 4. Furthermore, it can be noted that such an opening 18a is provided to subsequently connect the hidden face 21b of the external part element 4 to the face for receiving the second part 8b of the mould.

This step of designing subsequently comprises a sub-step of applying at least one coating on a top face of this external part element 4. It will be noted that this top face corresponds to the visible face of the external part element 4 obtained in the support plate after this design step. During this sub-step, several coats can be applied on this visible face.

This step of designing then comprises a sub-step of creating at least one blind opening 18b in the thickness of the external part element 4, said blind opening 18b comprising a variable cross-section along its revolution axis B interconnecting the centres of the injectable material entry orifice and the bottom of this opening with each other. Such a configuration of the blind opening 18b contributes to defining the shape of the foot 23b of the three-dimensional element 10 formed by the injectable material included in this blind opening 18b. Thus this foot 23b is configured particularly in the shape thereof to secure this three-dimensional element 10 in the body of the external part element 4.

Such a process comprises a step 30 of preparing at least one impression 5 in the first part 8a using at least one original part relative to said at least one three-dimensional element 10 to be manufactured. It is understood that this step 30 is capable of helping produce as many impressions 5 as there are three-dimensional elements 10 to produce, such that such impressions 5 are over-moulded on the same external part element 4. This step 30 provides the production of an impression 5 from an original part also referred to as "master". This original part has a similar shape to that of the three-dimensional element 10 to be produced. It will be noted that the implementation of this step 30 can require as many original parts as there are impressions 5 to be produced.

In this context, the preparation step 30 comprises a sub-step 31 of designing said original part implemented using a lithography technique. This lithography technique is chosen from the following techniques known from the prior art which are not described in more detail here: ultraviolet optical projection lithography, DUV projection optical lithography, immersion lithography, double exposure lithography, extreme ultraviolet lithography, nanoimprint lithography.

This preparation step 30 then comprises a sub-step 32 of replicating the original part aimed at producing the external part element 5 by reproducing a negative shape of the original part. This sub-step 32 in particular provides the implementation of Ni-shims or BMG (acronym of "Bulk Metallic Glass") techniques known from the prior art which are not described in more detail here.

Subsequently, the process includes an arrangement step 33 in the mould 2 of the support plate 3 comprising the external part element 4, said mould 2 being formed by the reversible assembly of the first and second parts 8a, 8b. During this step 33, the support plate 3 is positioned in the bed defined by the reversible assembly of these first and second parts 8a, 8b. Such an arrangement step 33 comprises a reversible assembly sub-step 34 of the second part 8b with the support plate 3 comprising this external part element 4. This sub-step 34 comprises a connection phase 35 of one end of the injection circuit 9 arranged in this second part 8b with the entry orifice of the through opening 18a of the external part element 4. Such a sub-step 34 helps make an optimal connection between the end of the injection circuit 9 arranged in this second part 8b with the through opening 18a defined in the external part element 4 and in particular with the entry orifice of this opening 18a. It is understood that this circuit 9 includes as many ends as the external part element 4 comprises entry orifices of through openings 18a. It will be noted that the entry orifice is comprised in the hidden face 21b of the external part element 4. Such an arrangement step 33 also comprises a sub-step 36 of forming at least one cavity 7 in this mould 2 by associating the first part 8a including at least one impression 5 with the visible face 21a of the external part element 4. It will be noted that each cavity 7 is defined for the preparation/formation of the blank 20 of the three-dimensional element 10. In other words, this cavity 7 of the mould 2 by being formed by associating at least one impression 5 of the first part 8a of the mould 2 with the visible face 21a of the external part element of this mould 2, defines a space corresponding to the volume and to the shape of the blank 20 of the three-dimensional element 10 which is produced here.

The process then comprises a step 37 of constructing said at least one blank 20 relative to the three-dimensional element 10 on the visible face 21*a* of the external part element 4. This step 37 comprises an over-moulding sub-step 38 by injecting injectable material into the cavity 7 via a through opening 18*a* arranged in said external part element 4 provided with an entry orifice of said cavity 7. The aim of this sub-step 38 is that of carrying out an over-moulding of the blank 20 of the three-dimensional element 10 on the corresponding zone 6 of the visible face 21*a* of the external part element 4. Such a sub-step 38 comprises an injection phase 39 into this cavity 7 of the injectable material from the device 11 for injecting this material. In this context, the injectable material from the injection device 11 is introduced into the cavity 7 by passing through the injectable material injection circuit 9 defined in the second part 8*b* and the through opening 18*a* comprised in the external part element 4 connecting this injection circuit 9 to said cavity 7. Thus, the injectable material then occupies the entire volume defined in the cavity 7 by over-moulding the corresponding zone 6 of the visible face 21*a* of the external part element 4 arranged facing the impression 5, with a view to forming this blank 20 of the three-dimensional element 10.

Such an over-moulding step 38 can comprise the following phases:
- a phase of evacuating 40 said cavity 7 before carrying out the phase of injecting 39 the injectable material into this cavity 7, and/or
- a phase of regulating 41 the temperature of the cavity 7 particularly during a period spreading from before the start of the phase of injecting 39 injectable material into the cavity 7 to the end of this material injection phase 39 or after this end of this injection phase 39.

Such phases of evacuation 40 and temperature regulation 41 are aimed at ensuring a structuring homogeneity of the blank 20 of the three-dimensional element 10 during the over-moulding thereof on the external part element 4 in order to remove the presence of any defect capable of being present on the visible outer face of this blank 20. Such a defect can for example consist of the presence of a weld line on the visible outer face of the blank 20, formed following the joining of two flows of injectable material into the cavity 7. Such a weld line is often present on blanks 20 of three-dimensional elements 10 relative to appliques having the shape of a 6, 8 or 0 numeral.

During the implementation of the evacuation phase 40, the fluid present in the cavity 7 for example a gas such as air is then evacuated from the cavity 7 before carrying out the injection phase 39.

When carrying out the temperature regulation phase 41 of the cavity 7, the temperature in the cavity 7 is then heated to a temperature which is greater or substantially greater than the temperature of the injectable material from the device 11 for injecting this material, before carrying out the injection phase 39. Subsequently, one the injectable material injection phase 39 has been carried out i.e. completed, the cavity 7, is cooled immediately.

The process then comprises a finalisation step 42 of said at least one blank of the three-dimensional element 10. This step 42 comprises an application sub-step 43 of a coating on said blank 20 of this three-dimensional element 10 over-moulded on the external part element 4. Such an application sub-step 43 is implemented after carrying out of the following sub-steps of this finalisation step 42:

- a sub-step of disassembling 44 the first part 8*a* from the second part 8*b* of the mould 2, or
- a sub-step of removing 45 said mould 2 from the support plate 3 comprising the external part element 4 provided with said at least one blank 20 of the three-dimensional element 10 over-moulded on the visible face of this external part element 4.

Indeed, following one or the other of these two sub-steps 44, 45, the application sub-step 43 comprises a deposition phase 46 of the decorative and/or functional material on the visible outer face of each blank 20 of the three-dimensional element 10 over-moulded on this external part element 4. For example, this deposition phase 46 can provide the application on this outer face of the blank 20 of a decorative material comprising a metallic composition. Such a deposition phase 46 can then be carried out according to a technology implementing direct current cathode sputtering or high-power impulse magnetron sputtering better known under the acronym HIPIMS.

It will be noted that when application sub-step 43 is carried out following the disassembly sub-step 44 of the first part 8*a* from the second part 8*b* of the mould 2, the deposition phase 46 is performed with the support plate 3 which is still fitted/fastened on the second part 8*b* of the mould 2. Furthermore, in this context, following this deposition phase 46, the process provides the implementation of the removal sub-step 45 of the support plate 3 from the mould 2.

In this process, the removal sub-step 45 comprises a breaking phase 47 of the injection point 22 linking the support plate 3 and/or the external part element 4, comprising the blank 20 of the three-dimensional element 10 or the three-dimensional element 10, to the second part 8*b*. This phase 47 comprises a sub-phase 48 of applying a force on the support plate 3 comprising this external part element 4 aimed at triggering a rotation or translation movement of this plate relative to the second part 8*b* and thus triggering the break of this injection point 22. It will be noted that once the injection point 22 has been broken, the base of the foot of the three-dimensional element 10 formed in the through opening 18*a* is substantially level with the hidden face 21*b* of the external part element 4 or strictly level with this hidden face 21*b*.

Once the support plate 3 has been removed from this second part 8*b*, the external part element 4 is then separated from the support plate 3 in order to be fitted in a timepiece or to be in turn finalised by applying a coating layer on the remaining visible face 21*a* i.e. on the portion of this face 21*a* which is not concealed by the three-dimensional element(s) 10.

It will furthermore be noted as we mentioned above that each external part element 4 can comprise several three-dimensional elements 10 and under these conditions as many injection points 22 as there are three-dimensional elements 10.

Thus, the invention thus helps produce at least one three-dimensional element 10 on the visible face 21*a* of external part elements 4 of timepieces.

The invention claimed is:

1. A process for producing at least one three-dimensional element on a visible face of an external part element of a timepiece, said process comprising:
    designing a support plate comprising the external part element including a sub-step of creating at least one through opening in a thickness of the external part element, said at least one through opening comprising a variable cross-section along a revolution axis thereof interconnecting centers of entry and exit orifices of said at least one through opening with each other;

arranging the support plate comprising the external part element in a mold formed by reversible assembly of first and second parts, said arranging comprising a sub-step of forming at least one cavity in said mold by associating the first part including at least one impression with the visible face of the external part element;

constructing a blank of each three-dimensional element on the visible face of the external part element, said constructing comprising a sub-step of over-molding by injecting an injectable material into the cavity via the at least one through opening arranged in said external part element at an injection point provided at the entry orifice of said at least one through opening; and finalizing the blank of the three-dimensional element comprising a sub-step of applying a coating on said blank over-molded on the external part element after carrying out one of the following sub-steps of said finalizing:

a sub-step of disassembling the first part from the second part of the mold, or a sub-step of removing said mold from the support plate comprising the external part element provided with the blank of the three-dimensional element over-molded on the visible face thereof.

2. The process according to claim 1, wherein said arranging comprises a sub-step of reversible assembly of the second part with the support plate comprising the external part element, said sub-step comprising connecting one end of an injection circuit arranged in said second part with the entry orifice of the at least one through opening of the external part element.

3. The process according to claim 1, wherein said removing sub-step comprises breaking the injection point connecting said external part element to the second part.

4. The process according to claim 1, wherein the over-molding sub-step comprises regulating temperature of said mold during a period spreading from before a start of the injecting the injectable material into the cavity to an end of said injecting the injectable material or after said end of said injecting the injectable material.

5. The process according to claim 1, wherein the over-molding sub-step comprises evacuating said cavity before the injecting the injectable material into said cavity.

6. The method according to claim 1, wherein the applying sub-step comprises depositing a decorative and/or functional material on a visible outer face of the blank of the three-dimensional element over-molded on the external part element.

7. The process according to claim 1, further comprising preparing at least one impression in the first part using at least one original part relative to said at least one three-dimensional element to be manufactured.

8. The process according to claim 1, wherein the designing the support plate comprises a sub-step of creating at least one blind opening in the thickness of the external part element, said at least one blind opening comprising a variable cross-section along a revolution axis thereof interconnecting centers of an injectable material entry orifice and a bottom of said at least one blind opening.

9. The process according to claim 1, wherein the at least through opening comprises an axial cross-section between the entry orifice and the exit orifice, a surface area whereof is different from an axial cross-section comprising the entry orifice and a surface area of an axial cross-section comprising the entry orifice and a surface area of an axial cross-section comprising the exit orifice.

10. The process according to claim 1, wherein the at least through opening comprises an axial cross-section between the entry orifice and the exit orifice, a surface area whereof is different from an axial cross-section comprising the entry orifice or a surface area of an axial cross-section comprising the entry orifice or a surface area of an axial cross-section comprising the exit orifice.

11. The process according to claim 1, wherein the at least through opening comprises an axial cross-section between the entry orifice and the exit orifice, the surface area whereof is at least one of greater than a surface area of an axial cross-section comprising the exit orifice, and less than a surface area of an axial cross-section comprising the entry orifice.

* * * * *